United States Patent

[11] 3,631,741

[72] Inventor Donald W. Kelbel
 Muncie, Ind.
[21] Appl. No. 61,957
[22] Filed Aug. 7, 1970
[45] Patented Jan. 4, 1972
[73] Assignee Borg-Warner Corporation
 Chicago, Ill.

[54] TRANSMISSION
 16 Claims, 4 Drawing Figs.
[52] U.S. Cl. ................................................. 74/781,
 192/18
[51] Int. Cl. .............................................. F16h 3/44,
 F16h 57/10
[50] Field of Search .......................................... 74/781;
 192/18

[56] References Cited
 UNITED STATES PATENTS
3,209,620 10/1965 Moan .......................... 74/781
3,230,796 1/1966 Thomson ..................... 74/781

Primary Examiner—Robert M. Walker
Attorneys—Donald W. Banner, William S. McCurry and John W. Butcher ABSTRACT: An overdrive transmission adapted to be coupled as an auxiliary transmission to a conventional change speed transmission of an automobile and comprising planetary gearing having a planet gear carrier connected to and driven by the output shaft of the conventional transmission, a ring gear engaging the planet gears and connected to a tailshift driving the automobile wheels, and a sun gear engaging the planet gears and held by a friction brake to provide the overdrive speed ratio. A double-acting roller clutch device is positioned between the output shaft and tail shaft and controllable to directly connect the shafts in either direction of rotation of the shafts to prevent a freewheeling condition or when the brake is applied to provide the overdrive speed ratio, to provide an overrunning connection between the shafts.

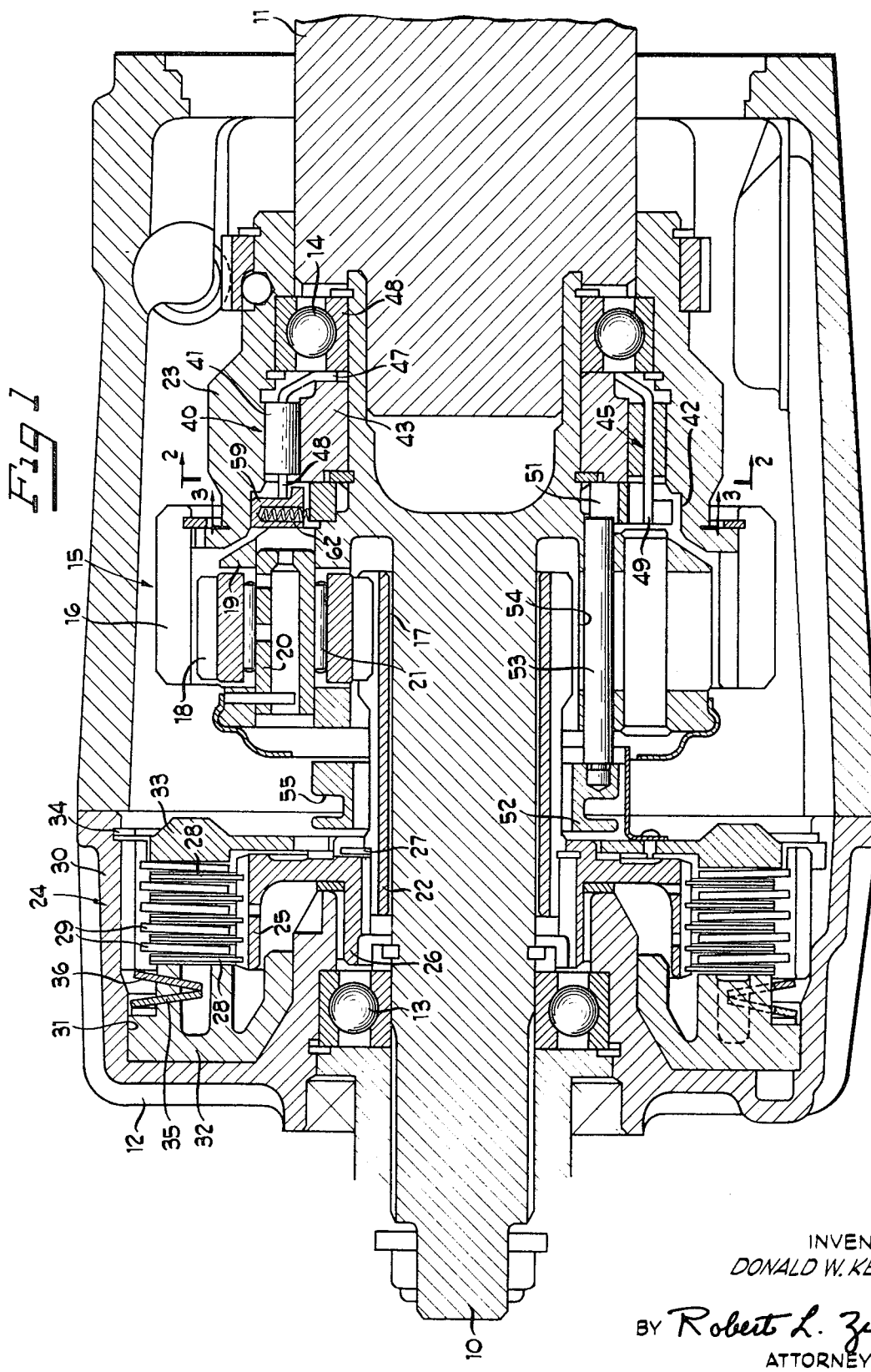

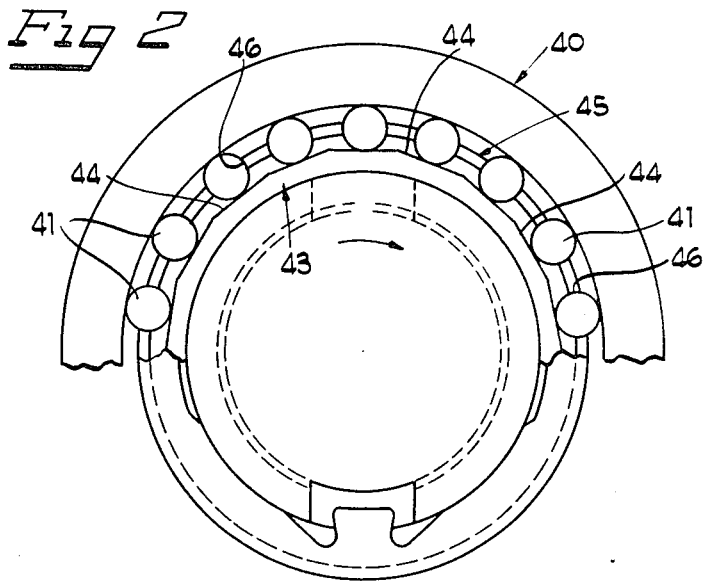
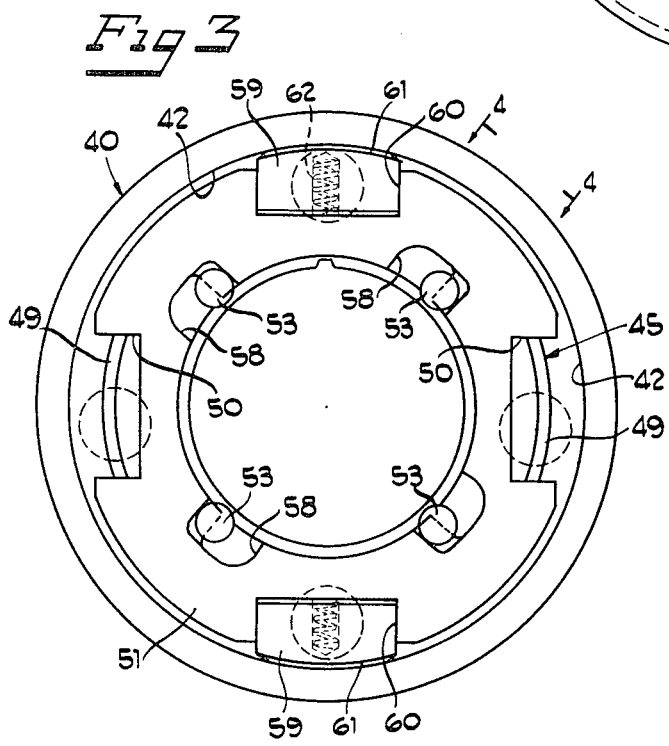
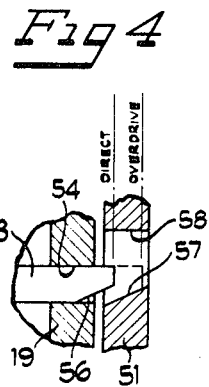

TRANSMISSION

BACKGROUND AND SUMMARY OF THE INVENTION

This invention relates to transmissions and more particularly to overdrive transmissions adapted for use as an auxiliary transmission with a conventional change speed transmission for an automobile.

Overdrive transmissions are generally located between a conventional change speed transmission-driven shaft and a tail shaft connected to the automobile rear wheels and include a planetary gear set having a planet gear carrier connected to the driven shaft and having its planet gears engaging a rotatable sun gear and also a ring gear connected to the tail shaft, and the sun gear may be held stationary by a releasable brake to provide an overdrive speed ratio between the shafts. In addition, the overdrive transmission includes a roller clutch device automatically permitting overrun of the tail shaft relative to the driven shaft during establishment of overdrive, and providing for coupling of the shafts to provide a direct drive from the driven shaft to the tail shaft when the overdrive is ineffective.

A problem exists in such overdrive transmissions as it is undesirable, when the one-way direct drive is effective, to permit the tail shaft to freewheel or overrun relative to the driven shaft, to interrupt the power flow when the automobile is operating under a coast load condition in which the automobile tends to drive the engine as when coasting down a hill. Various arrangements providing a two-way drive between the shafts have been proposed to insure driving connection continuity from the engine to the wheels and also from the wheels to the engine, while permitting the tail shaft to overrun the driven shaft during overdrive. One proposed arrangement contemplates the provision of a friction brake holding the sun gear stationary to provide overdrive; and a double-acting and a freewheeling clutch device between the conventional transmission driven shaft and the sun gear. With such an arrangement the planetary gear set is subject to strain and distortion with possible breakage, particularly during rapid changes in forward drive and coast drive conditions in normal operation of the automobile because in both overdrive and direct drive the power flow is through the gear set.

The present invention proposes to solve this problem by providing a double-acting roller clutch device between the conventional transmission driven shaft and the tail shaft connected to the automobile rear wheels so that these shafts are directly coupled to each other for direct drive conditions and the overdrive planetary gear set is bypassed.

Accordingly, it is an object of the invention to provide an improved overdrive transmission between driving and driven shafts and having releasable means engageable to provide overdrive, and also a double-acting roller clutch device between and engageable with the shafts to provide a two-way direct drive connection of the shafts.

Another object of the invention is to provide an improved transmission having planetary gearing controllable to provide an overdrive between driving and driven shafts, and a double-acting roller clutch device between the driving and driven shafts and disposed in parallel with the gearing and operable to connect the shafts for direct drive in both relative directions of rotation of the shafts.

Another object of the invention is to provide an improved transmission for an automotive vehicle and having planetary gearing with its sun gear controllable by a brake to provide an overdrive between the driving and driven shafts, and a double-acting roller clutch device between the driving and driven shafts and in parallel with the gearing and controllable to permit overrunning of the driven shaft relative to the drive shaft during overdrive and to connect the shafts for direct drive.

Additional objects and advantages of the invention will become more apparent from the following description taken in conjunction with the accompanying drawing in which:

DESCRIPTION OF THE DRAWINGS

FIG. 1 is a longitudinal sectional view of a transmission embodying the principles of the invention;

FIG. 2 is a transverse sectional view taken along line 2—2 of FIG. 1;

FIG. 3 is a transverse sectional view taken along line 3—3 of FIG. 1; and

FIG. 4 is a partial edge view along the plane of line 4—4 of FIG. 3.

DESCRIPTION OF THE PREFERRED EMBODIMENT

Referring to the drawings in detail and particularly FIG. 1, the transmission illustrated comprises a drive shaft 10 and a driven shaft 11. The drive and driven shafts are adapted to be rotatably disposed within a transmission casing 12 with the bearings 13 and 14 being utilized to support the drive shaft 10 and the driven shaft having its forward end rotatably positioned within the hollow end portion of the drive shaft. The transmission is adapted to be used in an automotive vehicle, and the drive shaft 10 may be driven from the driving engine of the vehicle preferably through a suitable change speed transmission (not shown) providing a plurality of forward speed ratios and a reverse drive, and the driven shaft or tail shaft is adapted to be connected with the vehicle driving wheels (not shown) by any suitable connecting means such as the ordinary automobile propeller shaft and differential. Alternately, the driven shaft may be the ordinary automobile propeller shaft and the tail shaft be connected directly to the differential.

The transmission comprises a planetary gear set 15 having rotatable elements including a ring gear 16, a sun gear 17, and a plurality of planet gears 18 (one being shown in the drawing) in mesh with the sun and ring gears. The planet gears 18 are rotatably disposed on a planet gear carrier 19 by means of stub shaft 20 and bearing needles 21 are preferably disposed within the gears 18 and on the shafts 20 to minimize friction between the gears 18 and carrier 19. The sun gear 17 is integrally formed on a sleeve shaft 22 rotatably mounted in the housing 12. The ring gear 16 is splined to the bell-shaped member 23 which is splined to the driven shaft 11. The planet gear carrier 19 is formed integrally with the drive shaft 10.

The sun gear 17 is adapted to constitute a reaction element of the gear set 15 and is made operative to function in this capacity by means of a friction brake 24. The brake 24 provides means for releasably holding one of the gear set elements, namely the sun gear 17, stationary to complete an overdrive power train from the drive shaft 10 to the driven shaft 11. The brake 24 includes a sleeve 25 which is integral with a collar portion 26 splined and keyed to the sleeve shaft 22 for rotation with the sun gear 17. The brake sleeve 25 is prevented from axial movement on shaft 22 by locking means 27 positioned within radially spaced grooves in shaft 22 and collar portion 26. A plurality of friction discs 28 are splined to the sleeve 25 so as to be rotatable therewith. Alternately positioned between the discs 28 are a plurality of discs 29 which are keyed to a cylindrical member 30 integrally formed as a part of the casing 12. The casing has an annular cylinder 31 formed therein within which an annular piston element 32 is reciprocable. When fluid under pressure is admitted to the cylinder 31 behind the piston 32, the discs 28 and 29 are compressed against a pressure plate 33, the pressure plate being splined to the member 30 and held against longitudinal displacement by an annular key 34. Compression of the discs 28 and 29 between the piston 32 and the pressure plate 33 causes the brake 24 to be engaged and this holds the sun gear 17 stationary to provide the necessary reaction for completing the overdrive from the drive shaft 10 to the driven shaft 11. A pair of Belleville washer-type springs 35 and 36 are positioned in back-to-back relation between the piston 32 and the adjacent ends of the splines on the member 30. The member 30 provides a reaction point for the springs, which serve to bias the piston to the left to cause disengagement of the brake 24, upon release of fluid under pressure in cylinder 31.

A double-acting roller clutch device, generally indicated at 40, is provided between the driving and the driven shafts 10 and 11 and is controllable to provide a condition permitting the driven shaft 11 to overrun the drive shaft 10 during establishment of overdrive, and to provide conditions affording direct driving connections of the shafts to transmit torque in both relative directions of rotation of the shafts, i.e., when the drive is from the engine to the vehicle wheels, and when the vehicle is coasting and the wheels are connected to the engine to provide engine braking.

More particularly, the roller clutch device 40 includes a plurality of rollers 41 engaging the inner cylindrical gripping surface 42 of the bell-shaped member 23, forming the outer race of the clutch, and the external surface of an inner cam member or sleeve 43, forming the inner race of the clutch. The external surface of sleeve 43 is constructed as a polygon in cross section to provide a plurality of angularly disposed flat cam faces 44 engaging the rollers 41. The rollers are arranged in openings in an annular cage 45, each roller being disposed in a port 46 of suitable size to receive the cylindrical rollers. The cage 45 encircles the polygonal sleeve 43 and has one inwardly extending end 47 engaging the sleeve 43, the other end 48 of the cage being formed with axially extending portions or tongue 49 spaced circumferentially of each other and extending toward the left from the rollers as viewed in FIG. 1 and adapted to be received within diametrically spaced notches 50 of an annular end plate 51 as shown in FIG. 3. The cage and end plate thus form a unitary cup-shaped cage assembly having small rotational movement relative to the shaft 10. Control means for moving the cage assembly to hold the rollers in nonwedging position include a thrust collar 52 which surrounds the sun gear sleeve 22 and carries four pins 53 equidistantly spaced about the circumference of the collar and slidingly supported within passages 54 in the planet gear carrier for movement to and from the cage assembly upon axial movement of the collar by a shift fork (not shown) positioned within a groove 55 in the thrust collar. The pins 53 are provided with cam surfaces 56 adapted for engagement with the similarly angular surfaces 57 on the edges of arcuate apertures or slots 58 in the inner periphery of the end plate 51 to locate the cage with respect to the inner race 43 and shaft 10 to position the rollers centrally between the ends of the flat cam faces or ramps 44 to thereby prevent wedging of the rollers between the inner and outer races so that the tail shaft 11 can overrun the driven shaft 10 during overdrive.

The two-way device also is provided with means for automatically rotating the cage assembly during relative rotation of the shafts 10 and 11 to position the rollers in wedging engagement with the inner and outer races 43 and 23 and comprising friction shoes 59 rectangularly shaped and slidingly positioned within similarly shaped notches 60 in the end plate 51 of the cage assembly for movement radially of the roller clutch to frictionally engage the arcuate faces 61 of the shoes with the cylindrical inner surface 42 of the bell-shaped member 23 and thereby rotate the cage assembly to move the rollers past the center of the flat ramps or cam surfaces 44 of the inner race to position the rollers in wedging engagement with the inner and outer races. Each friction shoe is formed with a centrally disposed opening receiving a coil spring 62 seated against the end plate 51 and biasing the shoe into engagement with the outer race 23.

OPERATION

In the overdrive speed ratio condition of the transmission, the thrust collar 52 is disposed in the position shown in dotted lines in FIG. 4 of the drawings so that the pins 53 are engaged with the end plate 51 to hold or lock the cage 45 with its rollers 41 centered midway between the flat ramps or cam surfaces 44 of the inner race 43, as shown in FIG. 2, to prevent the rollers establishing a driving connection between the races 23 and 43 and the shafts 10 and 11. In this position of the rollers, the driven shaft 11 overruns the drive shaft 10. At this time, the friction brake 24 is engaged to hold the sun gear 17 stationary and, as the planet gear carrier 19 is driven by the drive shaft 10, the ring gear 16 and shaft 11 are driven at an overdrive speed ratio.

In establishing direct drive between the drive and driven shafts, the friction brake is disengaged and the shift collar 52 is moved to the direct drive position shown in FIG. 4, to allow the friction shoes 59 to rotate the end plate and the cage into a direct driven position. Drive is effected from the engine through the drive shaft 10 and the two-way clutch device 40 directly to the driven shaft 11, the direction of forward rotation being indicated by the arrow in FIG. 2. More particularly, because the inertia of the vehicle and friction at the wheels causes resistance to rotation of the driven shaft 11, the inner race 43 of the clutch device will be driven by the input or drive shaft 10 in a direction to cause the cage 45 to start and move the rollers to a first position at one end of the flat cam faces 44 of the inner race 43 to thereby cause the rollers to be wedged between the inner and outer races to drivingly connect the races and thereby the shafts 10 and 11 in a 1:1 drive to the driving wheels.

When the vehicle is coasting and the wheels are attempting to drive the engine, the outer race 23 will be driven by the shaft 11. Because of the frictional engagement of the friction shoes 59 with the inner surface 42 of the outer race 23, the end plate 51 and thereby the cage 45 will be rotated in an opposite direction to that previously had so as to move the rollers to a second position at the other end of the flat faces 44 of the inner race 43 to provide engagement between the outer race 23 and inner race 43 thereby connecting the vehicle wheels to the engine in coast condition to provide engine braking.

FIG. 2 illustrates the various positions of the rollers 41 in relation to the races of the double-acting roller clutch assembly 40 and including the position in which the driven shaft 11 overruns the drive shaft 10 in overdrive; and the two direct-drive positions and, in one of which positions, the rollers 41 engage the races to directly connect the drive and driven shafts for engine driving of the driven shaft, and in the other position in which the rollers engage the races for vehicle pushing or driving the engine by the driven shaft, and for reverse drive of the driven shaft 11 by the drive shaft 10. FIG. 1 shows the movable thrust collar control of the overrunning clutch assembly and providing in one position, centering of the rollers to permit overrunning of the driven shaft relative to the drive shaft during overdrive; and in the other position, releasing the cage to permit roller engagement of the races for providing a direct driving connection between the drive and driven shafts in both relative directions of rotation of the shafts.

Various features of the invention have been particularly shown and described. However, it should be obvious to one skilled in the art that modifications may be made therein without departing from the scope of the invention.

What is claimed is:

1. In a change speed transmission, the combination of driving and driven shafts, a gear set operatively connected between said shafts and including a pair of rotatable members; means for releasably holding one of said members stationary to provide a reaction element to complete a speed ratio drive between said shafts; a roller clutch device between said shafts and being normally movable into a wedging position with said shafts in one as well as the other direction of rotation of said shafts relative to each other to directly connect said shafts to provide a drive in parallel with said speed ratio drive between said shafts; and control means for preventing said roller clutch device from assuming said wedging positions during establishment of said speed ratio drive.

2. In a change speed transmission, the combination according to claim 1 wherein said gear set comprises planetary gearing, and said reaction element of said gearing is a sun gear.

3. In a change speed transmission, the combination according to claim 2 wherein said holding means is a friction brake operable to hold said sun gear stationary.

4. In a change speed transmission the combination according to claim 1 wherein said roller clutch device is provided with an additional nonwedging position between the two wedging positions and said control means is operative to maintain said device in said nonwedging position during establishment of said speed ratio drive.

5. In a change speed transmission the combination according to claim 1 wherein said roller clutch device includes a pair of members connected to respective shafts and arranged concentrically one within the other, one of said clutch members having a plurality of cam faces and the other clutch member having a cylindrical surface, and rollers engageable with said cam faces and said cylindrical surface to provide said wedging positions.

6. In a change speed transmission the combination according to claim 1, wherein said roller clutch device includes inner and outer wedging members between said shafts and respectively connected to said shafts, wedging elements between said wedging members, and a cage for said wedging elements, said control means being operative to prevent wedging engagement of said wedging elements with said wedging members during establishment of said speed ratio drive.

7. In a change speed transmission the combination according to claim 1 wherein said gear set comprises planetary gearing including a ring gear connected to said driven shaft, a sun gear providing said reaction element and rotatable about said drive shaft, planet gears meshing with said sun and ring gears, and a planet gear carrier connected to said driven shaft; said holding means is a friction brake.

8. In a change speed transmission the combination according to claim 5 including a cage for said rollers, and means for frictionally engaging said cylindrical surface for moving said cage and thereby said rollers from one wedging position to the other wedging position during changes of direction of rotation of said shafts relative to each other.

9. In a change speed transmission the combination according to claim 5 including a cage for said rollers, and wherein said control means comprises an apertured plate connected to one end of said cage, at least one pin supported for movement axially of said shafts into an aperture of said plate to locate said plate and thereby said cage to position said rollers to prevent wedging engagement of said rollers with said cam faces and said cylindrical surface.

10. In a change speed transmission the combination according to claim 9 wherein said plate is provided with spaced pockets, friction shoes radially movable in said pockets, and means biasing said friction shoes into frictional contact with said cylindrical surface.

11. In a change speed transmission the combination according to claim 9 including a thrust collar surrounding and in spaced relation to said drive shaft and connected to said pin and operable to move said pin.

12. In a change speed transmission, the combination according to claim 5 including a cage assembly for said rollers, said cage assembly having spaced pockets, friction shoes radially movable in said pockets, and means biasing said friction shoes into frictional contact with said cylindrical surface.

13. In a change speed transmission the combination according to claim 1 wherein said roller clutch device includes a pair of clutch members connected to respective shafts and arranged concentrically one within the other, one of said clutch members having a plurality of cam faces and the other clutch member having a cylindrical surface, and rollers engageable with said cam faces and said cylindrical surface to provide said wedging positions, and a cage for said rollers, and wherein said control means comprises an apertured plate connected to one end of said cage, and at least one pin supported for movement axially of said shafts into an aperture of said plate to locate said plate and thereby said cage to position said rollers to prevent wedging engagement of said rollers with said cam faces and said cylindrical surface.

14. In a change speed transmission the combination according to claim 13 wherein said plate is provided with spaced pockets, friction shoes radially movable in said pockets, and means biasing said friction shoes into frictional contact with said cylindrical surface.

15. In a change speed transmission the combination according to claim 1 wherein said roller clutch device includes a pair of clutch members connected to respective shafts and arranged concentrically one within the other, one of said clutch members having a plurality of cam faces and the other clutch member having a cylindrical surface, and rollers engageable with said cam faces and said cylindrical surface to provide said wedging positions, and a cage for said rollers, and wherein said control means comprises an apertured plate connected to one end of said cage, and at least one pin supported for movement axially of said shafts into an aperture of said plate to locate said plate and thereby said cage to position said rollers to prevent wedging engagement of said rollers with said cam faces and said cylindrical surface.

16. In a change speed transmission the combination according to claim 15 wherein said plate is provided with spaced pockets, friction shoes radially movable in said pockets, and means biasing said friction shoes into frictional contact with said cylindrical surface.

* * * * *